(12) United States Patent
Ansari et al.

(10) Patent No.: US 8,700,928 B2
(45) Date of Patent: Apr. 15, 2014

(54) HIERARCHICAL ENERGY OPTIMIZATION FOR DATACENTER NETWORKS

(75) Inventors: Nirwan Ansari, Montville, NJ (US); Yan Zhang, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 13/819,267

(22) PCT Filed: May 21, 2012

(86) PCT No.: PCT/US2012/038891
§ 371 (c)(1),
(2), (4) Date: Feb. 26, 2013

(87) PCT Pub. No.: WO2013/176651
PCT Pub. Date: Nov. 28, 2013

(65) Prior Publication Data
US 2014/0047252 A1   Feb. 13, 2014

(51) Int. Cl.
G06F 1/00      (2006.01)
G06F 1/26      (2006.01)
G06F 1/32      (2006.01)
G06F 15/173    (2006.01)
H04L 12/28     (2006.01)

(52) U.S. Cl.
USPC ........... 713/300; 713/320; 709/223; 709/224; 709/225; 709/226; 370/254; 370/255; 370/256

(58) Field of Classification Search
USPC .......... 713/300, 320; 709/223, 224, 225, 226; 370/254, 255, 256
See application file for complete search history.

(56) References Cited

U.S. PATENT DOCUMENTS

| | | | |
|---|---|---|---|
| 6,594,268 B1 * | 7/2003 | Aukia et al. | 370/400 |
| 6,721,270 B1 * | 4/2004 | Mitra et al. | 370/230 |
| 2009/0171511 A1 | 7/2009 | Tolentino | |
| 2010/0235840 A1 | 9/2010 | Angaluri | |
| 2011/0055611 A1 | 3/2011 | Sharma et al. | |
| 2012/0030345 A1 | 2/2012 | Mahadevan et al. | |

OTHER PUBLICATIONS

International Search Report and the Written Opinion for PCT/US2012/038891, Filed May 21, 2012, Mailed Jul. 19, 2012.
Wang, X. et al., "SHIP: Scalable Hierarchical Power Control for Large-Scale Data Centers", 2009 18th International Conference on Parallel Architectures and Compilation Techniques, pp. 91-100, Sep. 12-16, 2009.
Chiaraviglio, Luca et al., Energy-Aware Networks: Reducing Power Consumption by Switching Off Network Elements; http://citeseerx.ist.psu.edu/viewdoc/summary?doi=10.1.1.160.9134.

(Continued)

*Primary Examiner* — Mark Connolly
(74) *Attorney, Agent, or Firm* — Turk IP Law, LLC

(57) ABSTRACT

Technologies are presented for power optimization of datacenter networks in a hierarchical perspective. In some examples, a two-level power optimization model may be established to reduce the power consumption of datacenter networks by switching off network switches and links while still guaranteeing full connectivity and maximum link utilization. The model may be implemented by solving a capacitated constraint multi-commodity flow (CMCF) problem employing simple heuristic techniques. A power status of network switches may be determined according to a network traffic matrix and the CMCF optimization determined at core-level and at pod-level. A complementary process to provision whole network connectivity and to meet quality of service (QoS) goals may also be performed.

20 Claims, 7 Drawing Sheets

(56) References Cited

OTHER PUBLICATIONS

U.S. Environmental Protection Agency, "Environmental Protection Agency, Report to Congress on Server and Data Center Energy Efficiency Public Law 109-431," Energy Star Program, Aug. 2007.

Barroso, L. A. et al., "The Case for Energy-Proportional Computing," Computer, vol. 40, No. 12, pp. 33-37, Dec. 2007.

Chiaraviglio, Mellia et al.,"Reducing Power Consumption in Backbone Networks," Dresden, Germany, Jun. 14-18, 2009, pp. 1-6.

Fisher, W. et al., "Greening Backbone Networks: Reducing Energy Consumption by Shutting Off Cables in Bundled Links," in Proc. of the SIGCOMM '10, Aug. 30-Sep. 3, 2010, pp. 29-34.

Heller, B. et al.,"ElasticTree: Saving Energy in Data Center Networks," in Proc. of the 7th Symposium in Networked Systems Design and Implementation, San Jose, CA, Apr. 2010, pp. 249-264.

Shang, Y. et al., "Energy-Aware Routing in Data Center Network," in Proc. of SIGCOMM '10, New Delhi, India, Aug.30-Sep. 3, 2010, pp. 1-8.

Cisco Data Center Infrastructure 2.5 Design Guide; Cisco Validated Design I, Dec. 6, 2007.

Leiserson, C. E. et al., "Fat-Trees: Universal Networks for Hardware-Efficient Supercomputing," IEEE Trans. on Computer, vol. 34, No. 10, pp. 892-901, Oct. 1985.

Greenberg, A. et al., "VL2: a Scalable and Flexible Data Center Network," in Proc. of the ACM SIGCOMM Conference on Data Communication (SIGCOMM '09), Barcelona, Spain, Aug. 17-21, 2009, pp. 51-62.

Mysore, Niranjan, et al., "PortLand: a Scalable Fault-Tolerant Layer 2 Data Center Network Fabric," in Proc. of the ACM SIGCOMM Conference on Data Communication 2009 (SIGCOMM'09), Barcelona, Spain, Aug. 17-21, 2009, pp. 39-50.

Ghamlouche, T., et al., "Cycle-Based Neighbourhoods for Fixed-Charge Capacitated Multicommodity Network Design," Operations Research, vol. 51, Issue 4, pp. 655-667 (2003).

\* cited by examiner

HIERARCHICAL ENERGY OPTIMIZATION FOR DATACENTER NETWORKS

BACKGROUND

Unless otherwise indicated herein, the materials described in this section are not prior art to the claims in this application and are not admitted to be prior art by inclusion in this section.

Datacenters, facilities with network equipment and servers for data processing and/or storage, are prevalent and essential to provide a myriad of services and applications for business, communications, academic, and government systems. To provide a reliable and scalable computing infrastructure, the network capacity of datacenters is typically provisioned for busy-hour load, and thus datacenters consume a large amount of energy. The Report to Congress on Server and Data Center Energy Efficiency by the Environmental Protection Agency in 2007 assessed trends in the energy use and energy costs of datacenters and servers in the U.S., and outlined existing and emerging opportunities for improved energy efficiency. It is estimated that datacenters and servers consumed about 61 billion kilowatt-hours (kWh) in 2006 (1.5 percent of the total U.S. electricity consumption) for a total electricity cost of about $4.5 billion. The energy use of datacenters and servers in 2006 is estimated to be more than double the electricity that was consumed for this purpose in 2000 and could nearly double again in 2011 to more than 100 billion kWh, representing a $7.4 billion annual electricity cost.

The provisioning for busy-hour loads in a mismatch between datacenter utilization and power consumption. Numerous studies have shown that datacenter servers rarely operate at full utilization and it has been well established in the research literature that the average server utilization may often be below thirty percent of the maximum utilization in datacenters. The high operational costs and the mismatch between datacenter utilization and power consumption have spurred interest in improving datacenter energy efficiency. Reducing a number of available resources may not be acceptable from a customer experience perspective, however. Furthermore, taking resources offline may bring additional challenges in terms of planning, execution, and optimization.

SUMMARY

The present disclosure generally describes technologies for hierarchical energy optimization in datacenter networks.

According to some examples, a method for providing hierarchical energy optimization in a datacenter network may include determining a power status of switches according to a network traffic matrix, determining a core-level capacitated multi-commodity flow (CMCF) optimization, determining a pod-level capacitated multi-commodity flow (CMCF) optimization, and performing a complementary process to provision whole network connectivity and to meet quality of service (QoS) goals.

According to other examples, a server for providing hierarchical energy optimization in a datacenter network may include a memory configured to store instructions and a processing unit configured to execute a network management application in conjunction with the instructions. The network management application may determine a power status of switches according to a network traffic matrix, determine a core-level capacitated multi-commodity flow (CMCF) optimization, determine a pod-level capacitated multi-commodity flow (CMCF) optimization, and perform a complementary process to provision whole network connectivity and to meet quality of service (QoS) goals.

According to further examples, a computer-readable storage medium may have instructions stored thereon for providing hierarchical energy optimization in a datacenter network. The instructions may include determining a power status of switches according to a network traffic matrix, determining a core-level capacitated multi-commodity flow (CMCF) optimization, determining a pod-level capacitated multi-commodity flow (CMCF) optimization, and performing a complementary process to provision whole network connectivity and to meet quality of service (QoS) goals.

According to yet other examples, a datacenter network capable of hierarchical energy optimization may include multiple edge switches enabling a flow of outgoing traffic, multiple aggregation switches serving out-pod traffic in pods comprising groups of aggregation switches, and a management server. The management server may determine a power status of the edge switches and the aggregation switches according to a network traffic matrix, determine a core-level capacitated multi-commodity flow (CMCF) optimization, determine a pod-level capacitated multi-commodity flow (CMCF) optimization, and perform a complementary process to provision whole network connectivity and to meet quality of service (QoS) goals.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
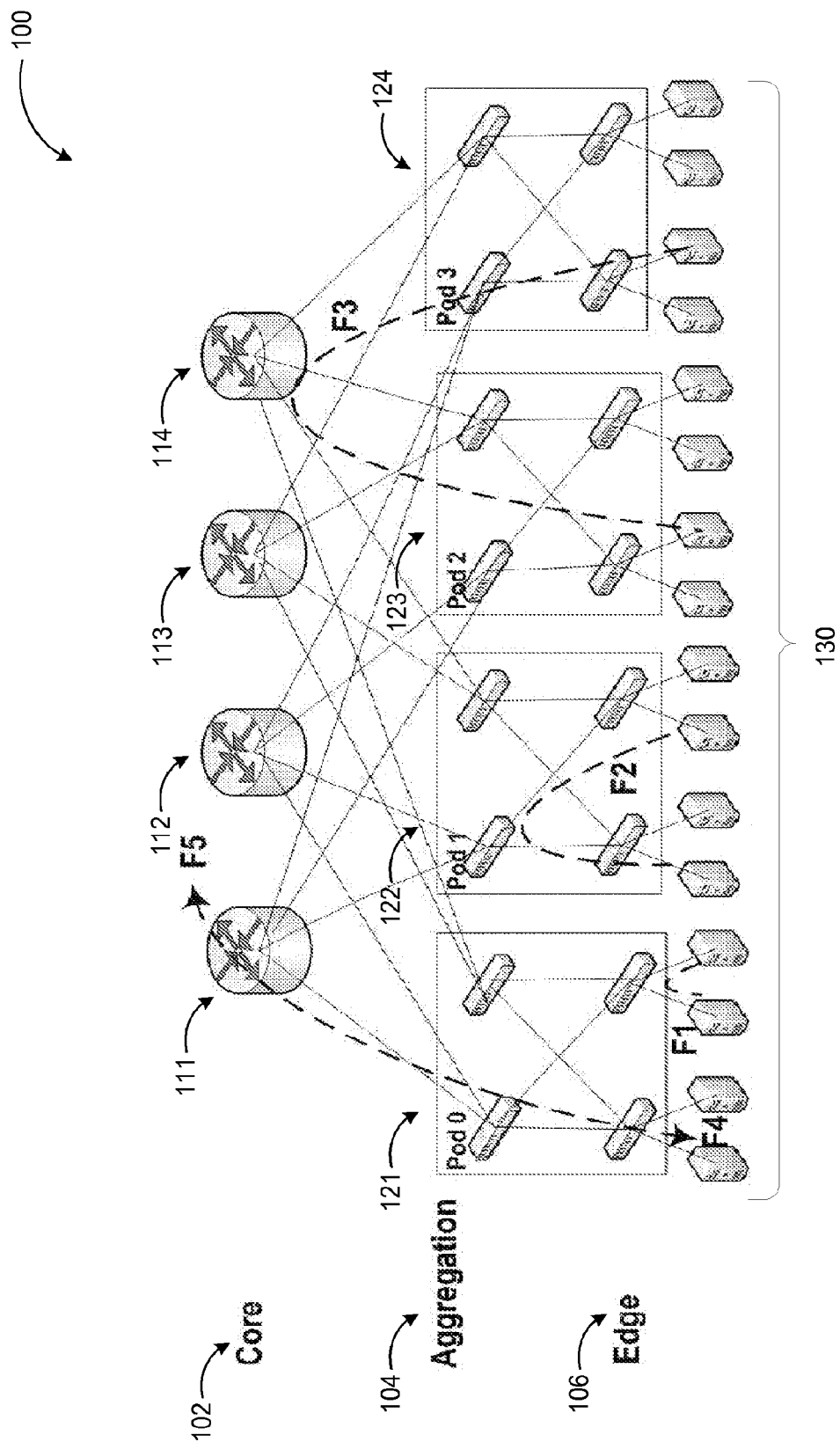
FIG. 1 illustrates an example datacenter network structure with edge switches, aggregation switches, and servers.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to providing hierarchical energy optimization in a datacenter network.

Briefly stated, technologies are generally provided for power optimization of datacenter networks in a hierarchical perspective. In some examples, a two-level power optimization model may be established to reduce the power consumption of datacenter networks by switching off network switches and links while still guaranteeing full connectivity and maximum link utilization. The model may be implemented by solving a capacitated constraint multi-commodity flow (CMCF) problem employing simple heuristic techniques. A power status of network switches may be determined according to a network traffic matrix and the CMCF optimization determined at core-level and at pod-level. A complementary process to provision whole network connectivity and to meet quality of service (QoS) goals may also be performed.

FIG. 1 illustrates an example datacenter network structure with edge switches, aggregation switches, and servers, arranged in accordance with at least some embodiments described herein.

Conventional approaches typically formulate the power optimization with a general network topology. As the datacenter networks are becoming larger, the complexity of solving the optimization problem increases. A vast majority of datacenter network topologies include a two- or three-tier hierarchical switching infrastructure such as conventional tree like switching infrastructure, Fat-Tree structure, VL2 structure, and similar ones. Embodiments provide a hierarchical energy optimization (HERO) model for power reduction of data centers. Given a datacenter network topology and a traffic matrix, the possibility of turning off some elements (i.e., switches and links) hierarchically may be evaluated without violating the connectivity and Quality of Service (QoS) constraints. The optimization is in the class of capacitated multi-commodity flow (CMCF) problem, which is NP-hard, and can be solved by a simple hierarchical greedy heuristic technique according to some examples.

Diagram 100 in FIG. 1 shows an example datacenter topology. As mentioned above, most datacenter network topologies typically include a two- or three-tier hierarchical switching infrastructure. The two-tier architecture consists of the edge and core switch tiers (106 and 102). In the three-tier architecture, an aggregation switch tier 104 is inserted in the middle of the core switch tier 102 and the edge switch tier 106. The edge switches and aggregation switches can form several switch groups which are called pods (121-124), and the core switches 111-114 form another one as shown in diagram 100.

Traffic in datacenter networks can be categorized into five classes: intra-edge switch traffic, inter-edge but intra-pod traffic, inter-pod traffic, incoming traffic, and outgoing traffic. For intra-edge switch traffic (shown as F1 in diagram 100), only the connected edge switch and links are needed to be powered on to minimize the power consumption. Inter-edge but intra-pod traffic goes within the same pod, but needs to go through different edge switches (shown as F2 in diagram 100). Inter-pod traffic is the flows that go through different pods (shown as F3 in diagram 100). Incoming (F4) and outgoing (F5) are traffic flows that go into and out of datacenter networks, respectively. In this example, four pod-level sub-networks can be formed with a pod, and a virtual node representing the destination of the out-pod traffic, and some virtual links connecting the virtual node with the aggregation switches in each pod. The fifth switch group can be formulated with the core switches, the links connecting the aggregation switches and the core switches, and the virtual nodes 130 each of which represents a pod.

From a hierarchical energy optimization perspective, power optimization of datacenters can be divided into two levels: core-level and pod-level. The objectives of core-level power optimization are two-fold: to determine the core switches that have to stay active to flow the outgoing traffic, and the aggregation switches which serve the out-pod traffic in each pod. The objective of pod-level power optimization is to determine the aggregation switches that have to be powered to flow the intra-pod traffic. The potential benefit of hierarchical energy optimization is to simplify energy optimization problem by reducing optimization variables greatly.

Given the network topology, the traffic matrix, and the power consumption of each link and node, the core-level and pod-level power optimization may be modeled as two capacitated multi-commodity flow (CMCF) problems, in which multiple commodities are routed over a network with maximum link capacity and utilization constraints. The basic assumptions for the modeling may be as follows:

(1) A physical network topology is given. The datacenter network infrastructure can be modeled by a graph G=(V, E), where V and E are the set of vertices and edges, respectively. $C_{ij}$ denotes the capacity of the link from node i to node j and $\alpha \in [0,1]$ represents the maximum link utilization. The core-level and pod-level power optimization problems may be solved based on the core-level sub-graph $G^C$ and a series of pod-level sub-graphs $G^P_i$. The core-level subgraph may be formulated in terms of the core switches, the links connecting the aggregation switches and core switches, and the virtual nodes, each of which represents a pod. A pod-level subgraph may be formulated in terms of a pod, and a virtual node representing the destination of the out-pod traffic.

(2) The average amount of traffic exchanged by any source/destination node pair is also given. $t_{sd}$ may be denoted as the average amount of traffic for the source-target pair (s, d) and $T=\{t_{sd}\}$ may represent the traffic demand matrix. By transforming the traffic demand matrix, the core-level traffic matrix and a series of pod-level traffic matrices may be obtained.

(3) The power consumption of each node and link is given. $P^N_i$ and $P^L_{ij}$ may be denoted as the power consumption of node i, and that of the link between node i and node j, respectively. $x_{ij}=\{0,1\}$ may be a binary variable that is equal to 1 if the link between node i and node j is powered on, otherwise it takes the value of 0. Similarly, $y_i=\{0,1\}$ may be a binary variable that takes the value of 1 if node i is powered on.

Based on the above definitions, the core-level CMCF problem can be formulated as follows. The objective function is to minimize.

$$P_{total}^C = \sum_{i=1}^{N^C} \sum_{j=1}^{N^C} x_{ij} P_{ij}^L + \sum_{i=1}^{N^C} y_i P_i^N, \quad [1]$$

where $N^C$ represents the total number of nodes in the core-level sub-graph $G^C$. The minimization may be subject to four constraints: flow conservation, demand satisfaction, capacity and utilization, and switch turn off.

Flow conservation states that commodities are neither created nor destroyed at intermediate nodes and can be formulated as:

$$\sum_{i=1}^{N_p} f_{ij}^{p_m p_n} - \sum_{i=1}^{N_p} f_{ji}^{p_m p_n} = 0, (\forall\ p_m, p_n, j \neq p_m, p_n), \quad [2]$$

where $f_{ij}^{p_m p_n}$ denotes the amount of flow from pod $p_m$ to pod $p_n$ routing through the arc from node i to j.

Demand satisfaction states that each source sends and sink receives an amount of flow equal to its demand, and can be formulated as:

$$\sum_{i=1}^{N_p} f_{ij}^{p_m p_n} - \sum_{i=1}^{N_p} f_{ji}^{p_m p_n} = \begin{cases} t_{p_m p_n}^c & \forall\ p_m, p_n, j = p_m \\ -t_{p_m p_n}^c & \forall\ p_m, p_n, j = p_n \end{cases}. \quad [3]$$

Capacity and utilization constraint provides that the total flow along each link $f_{ij}(\forall i,j)$ must be smaller than the link capacity weighed by the link utilization requirement factor $\alpha$, and can be formulated as:

$$f_{ij} = \sum_{i=1}^{N_p} \sum_{j=1}^{N_p} f_{ij}^{p_m p_n} \leq \alpha C_{ij} x_{ij}, \forall\ i, j. \quad [4]$$

Switch turn off rule provides a node can be turned off only if all incoming and outgoing links are actually turned off, and can be formulated as:

$$\sum_{j=1}^{N^C} x_{ij} + \sum_{j=1}^{N^C} x_{ji} \leq My_i, \forall\ i, \quad [5]$$

where M is twice of the total number of links connected to node i. The pod-level CMCF power optimization may be formulated in a similar manner.

A hierarchical energy optimization technique to implement the two-level CMCF power optimization may be performed in four steps according to some example embodiments. In the first step, the power status of the edge switches and edge links connecting the end hosts and edge switches may be determined according to traffic matrix T. All edge switches connecting to any source or destination server in the traffic matrix have to be powered on. The power status of the core switches and core-level links connecting the core switches and aggregation switches may be determined in a second step by solving the core-level CMCF optimization problem. The link between each aggregation switch and each core switch is unique, and therefore, the aggregation switches which serve the outgoing traffic in each pod may be selected by using the power status of core-level links.

In a third step, the power status of the aggregation switches serving intra-pod traffic and that of the pod level links connecting the edge switches and aggregation switches may be determined in each pod by solving the pod-level optimization problem. The aggregation switches selected to power on in the second stage and the link connecting the selected aggregation switch to the virtual node in each pod may be switched on. In a fourth step, in order to protect the whole network connectivity and QoS goals, a complementary process may be performed. For illustrative purposes, the complementary process may include one or more rules. For example, the rules may state "at least one core switch is powered on", and "at least one aggregation switch that can connect to one active core switch must be turned on in each pod." These rules may be adjusted flexibly to achieve different QoS and fault tolerance goals.

Figure 2:
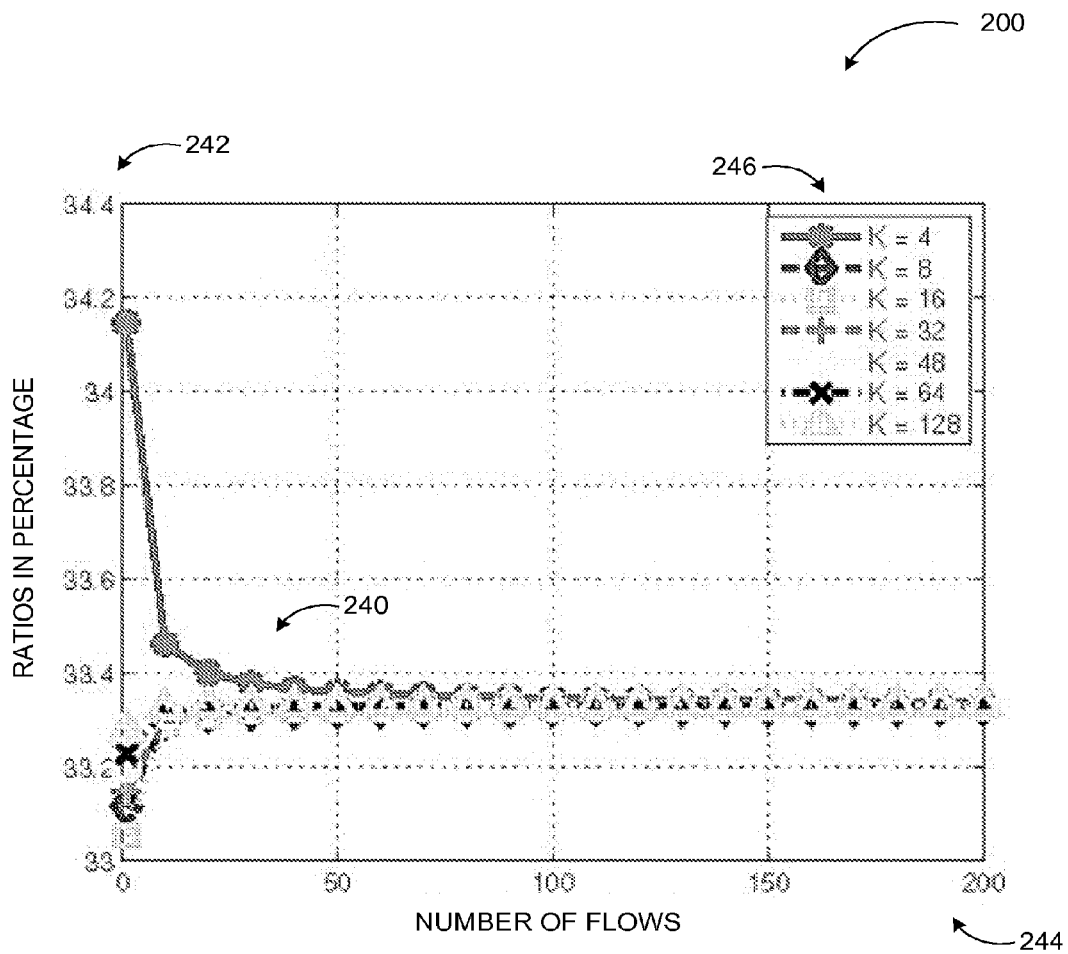
FIG. 2 illustrates a ratio of the total number of variables between hierarchical and non-hierarchical energy optimization techniques for an example network with Fat-tree topology.

An example technique may be as follows:
Stage 1: Determine in descending order of need to be powered on according to the traffic matrix T.
Stage 2: Solve the core-level CMCF optimization problem.
  Stage 2.1: The power status of core switches and core-level links connecting the aggregation switches and the core switches is decided by solving the core-level CMCF optimization problem.
  Stage 2.2: The aggregation switches serving the out-pod traffic in each pod are selected with the power status of the core-level links, and the selected aggregation switches are powered on.
Stage 3: Solve the pod-level CMCF optimization problem.
  for i=1 to Np do
    Determine the power status of the aggregation switches and the pod-level links connecting the edge switches and the aggregation switches by solving the pod-level optimization problem.
  end for
Stage 4: In order to provision the whole network connectivity and to meet QoS goals, a merging process is performed FIG. 2 illustrates a ratio of the total number of variables between hierarchical and non-hierarchical energy optimization techniques for an example network with Fat-tree topology, arranged in accordance with at least some embodiments described herein.

A system according to some embodiments may iterate through the node set or link set by sorting the nodes or links according to their power consumption in the node optimization or in the link optimization stage. Some heuristic routings aim to gradually eliminate the lightest loaded switch from those involved in the routing, based on the total throughput of flows carried by each active switch. The disadvantage of such an approach is that it does not take the switch power consumption model into consideration since different switch models may co-exist in one datacenter network.

The complexity of a CMCF optimization technique based on the [1] through [5] above may increase with the increase of total number of variables and total number of constraints. Thus, the complexities of hierarchical and non-hierarchical energy optimization may be compared in terms of the ratio of the total number of variables and the ratio of the total number of constraints. Diagram 200 in FIG. 2 presents the ratios of the total number of variables across percent ratios axis 242 and number of rows axis 244 between hierarchical and non-hierarchical energy optimization techniques with different values of K (246) and the total number of flows.

The ratios of the total number of variables between the hierarchical and the non-hierarchical models are smaller than 35% as shown by the plots 240. The plots 240 in diagram 200 are based on the condition that the total number of the core-level flows is the same as that of the entire network. Since in practical situations the total number of the core-level flows is usually much smaller than that of the whole networks, the plots 240 represent worst case scenario.

Figure 3:
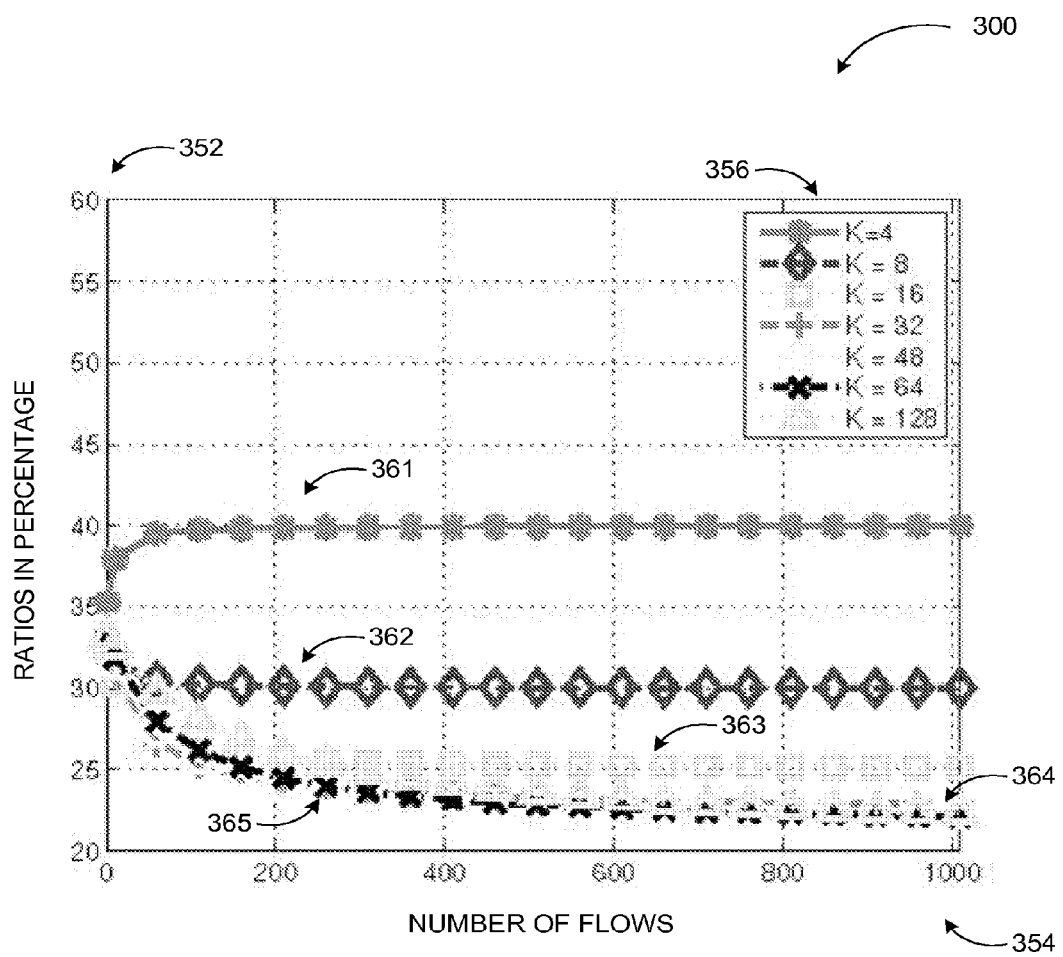
FIG. 3 illustrates a ratio of the total number of constraints between hierarchical and non-hierarchical energy optimization techniques for an example network with Fat-tree topology.

FIG. 3 illustrates a ratio of the total number of constraints between hierarchical and non-hierarchical energy optimization techniques for an example network with Fat-tree topology, arranged in accordance with at least some embodiments described herein.

As discussed above, the complexity of a CMCF optimization technique based on the [1] through [5] above may increase with the increase of total number of constraints as well. Thus, the complexities of hierarchical and non-hierarchical energy optimization may also be compared in terms of the ratio of the total number of constraints. Diagram 300 in FIG. 3 presents the ratios of the total number of constraints across percent ratios axis 352 and number of flows axis 354 between hierarchical and non-hierarchical energy optimization techniques with different values of K (356).

The ratios of the total number of constraints between the hierarchical and the non-hierarchical models are smaller than 40% as shown by the plots 361-365. As plots 361-365 in diagram 200 show the ratio of the total number of constraints decreases with the increase of parameter K with the same number of flows. Similar to diagram 200, the plots in diagram 300 are also based on the condition that the total number of the core-level flows is the same as that of the entire network. Thus, for the same reason discussed above, the plots 361-365 represent worst case scenario.

A number of simple greedy heuristic techniques based on different switch elimination criteria may be employed to solve the hierarchical optimization for large datacenter networks. An example technique may try to turn off the core switches and core-level links iteratively as well as the aggregation switches and pod-level links iteratively in the core-level and pod-level power optimization, respectively, so that as few switches and links as possible are powered on in datacenter networks to meet the traffic demands and QoS goals.

The switch elimination criterion may be switch throughput, switch power consumption, and switch power efficiency. In the core-level heuristic, the core switches may be sorted based on different criteria, and then the selected core switches may be turned off by checking if the traffic can be flowed through other active core switches. Based on the throughput-based criterion and switch power efficiency criterion, the core switches may be sorted in the ascending order, while the core switches may be sorted in the descending order if the switch power consumption criterion is adopted. Therefore, the core switch with the lowest throughput, the lowest power efficiency, or the highest power consumption model may be eliminated first. A similar heuristic may be applied to the pod-level optimization except that aggregation switches may be attempted to be turned off in each pod. According to other embodiments, the core switches may be determined in descending order of the total power consumption of each core switch and the aggregation switches that connect in the core-level power optimization.

Figure 4:
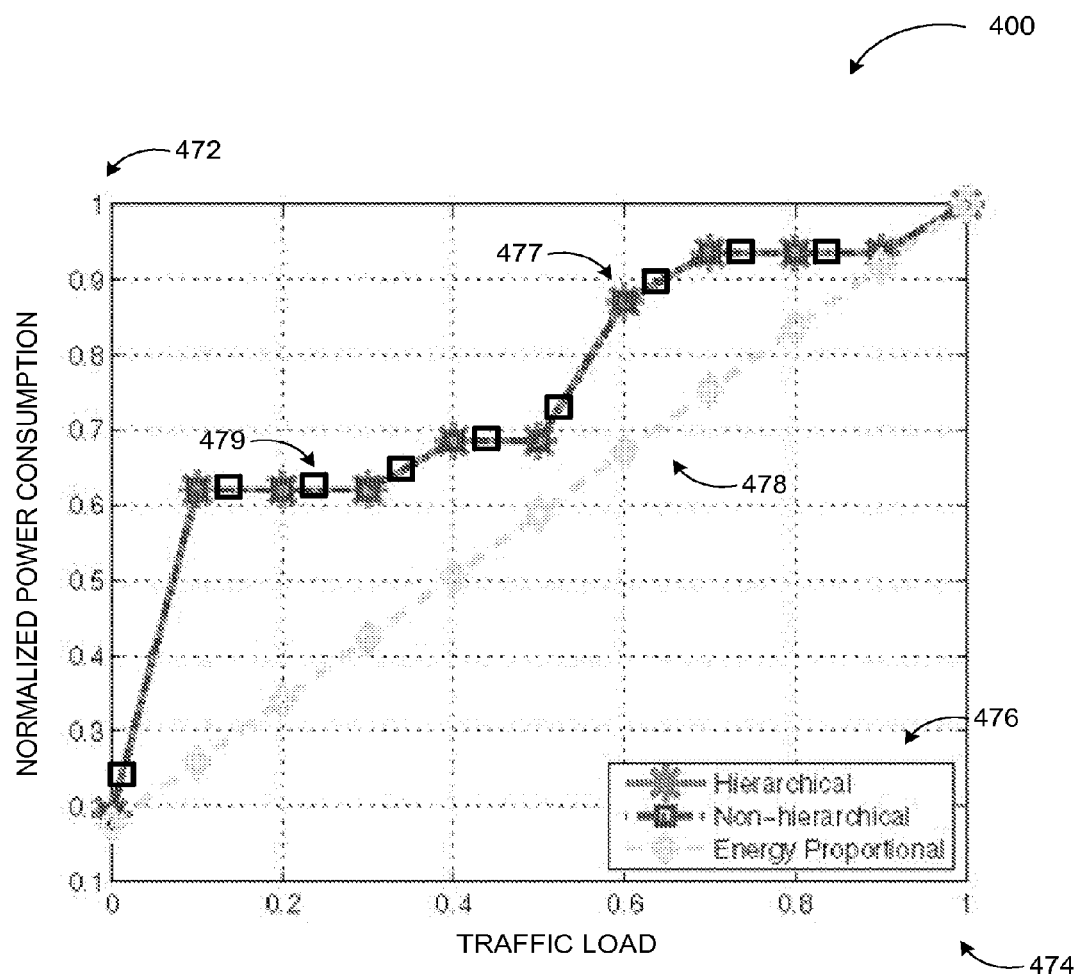
FIG. 4 illustrates a graph of power consumption of an example 4-ary Fat-tree datacenter network with all-to-all traffic under different traffic loads.

FIG. 4 illustrates a graph of power consumption of an example 4-ary Fat-tree datacenter network with all-to-all traffic under different traffic loads, arranged in accordance with at least some embodiments described herein.

In testing the optimization technique according to embodiments with large traffic flows and the traffic demand for each source-destination pair consuming the whole edge link capacity, the average power consumption of an example 4-ary Fat-tree network may show that a relatively small percentage of the maximum power consumption of the whole network may be consumed compared to a non-hierarchical model. Even with QoS and fault tolerance protection constraints implemented in a complementary procedure, a fraction (e.g., about 20%) of the maximum power consumption of the whole network may be needed as compared to the traffic-load power proportional model under the worst case.

Diagram 400 of FIG. 4 shows an evaluation of the performance of a system according to embodiments with small traffic flows. Across normalized power consumption axis 472 and traffic load axis 474, the power consumption of an example 4-ary Fat-tree network is illustrated with all-to-all traffic under different traffic loads. With all-to-all traffic, any host may have a traffic flow to any other end host. The traffic load generated at any host may be distributed to other hosts uniformly. As shown in diagram 400, the power consumptions of the hierarchical model 477 and the non-hierarchical model 479 are almost the same under different traffic loads. The power consumption of both at low traffic load is much higher than that of the traffic-load power proportional model 478 because every edge switch is active with all-to-all traffic. As traffic load increases, the hierarchical and non-hierarchical models converge to the proportional model 478. Legend 476 identifies the different plots.

Figure 5:
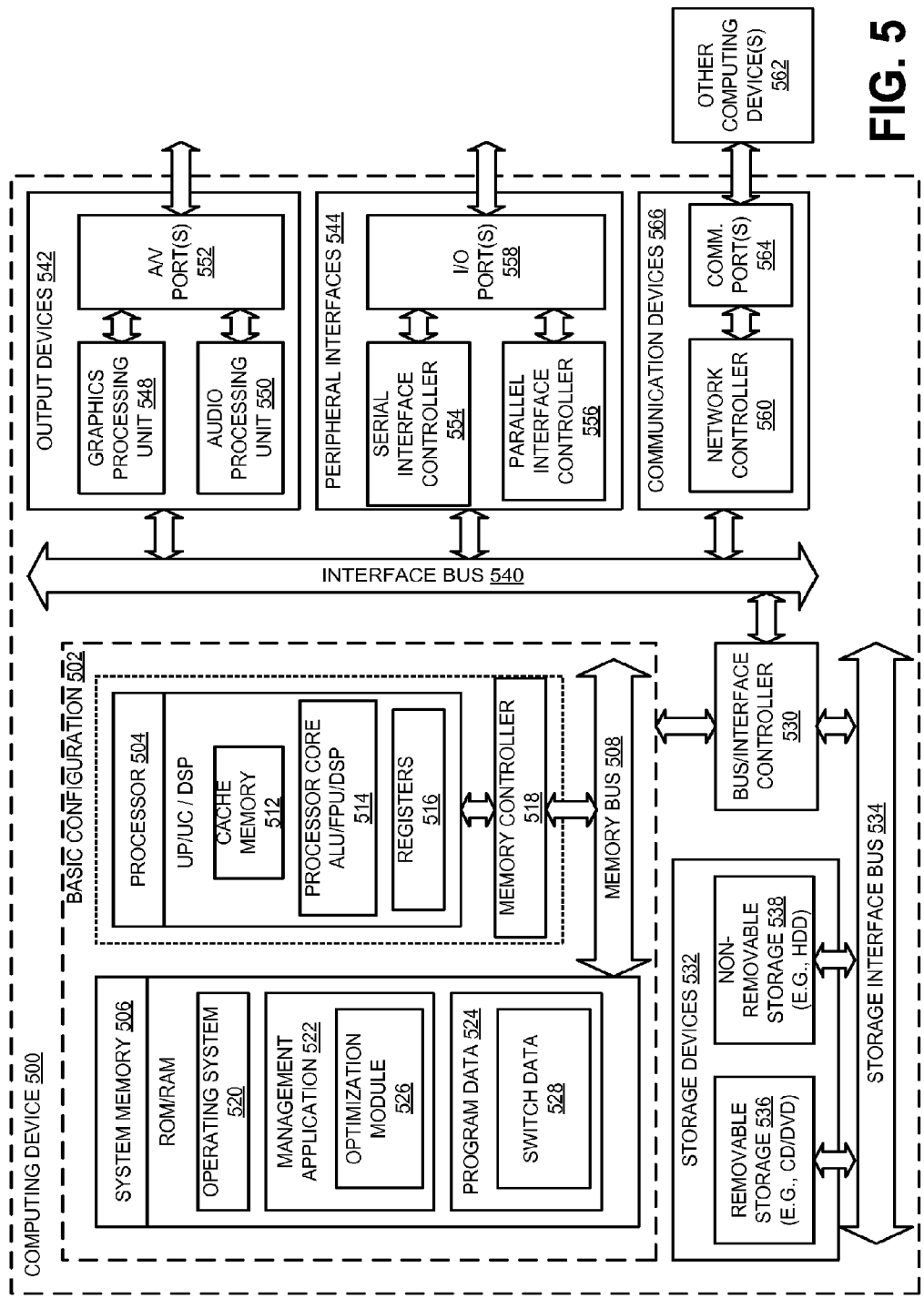
FIG. 5 illustrates a general purpose computing device, which may be used to provide hierarchical energy optimization in a datacenter network.

FIG. 5 illustrates a general purpose computing device, which may be used to provide hierarchical energy optimization in a datacenter network, arranged in accordance with at least some embodiments described herein. Computing device 500 may be a network management server or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more management applications 522, and program data 524. The management applications 522 may manage operations of a datacenter network, among other things, and include an optimization module 526, which may enable hierarchical energy optimization for the datacenter network as described herein. The program data 524 may include, among other data, switch data 528, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include network controller, servers, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for implementing iterative simulation of requirement metrics for assumption and schema-free configuration management in cloud migration. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
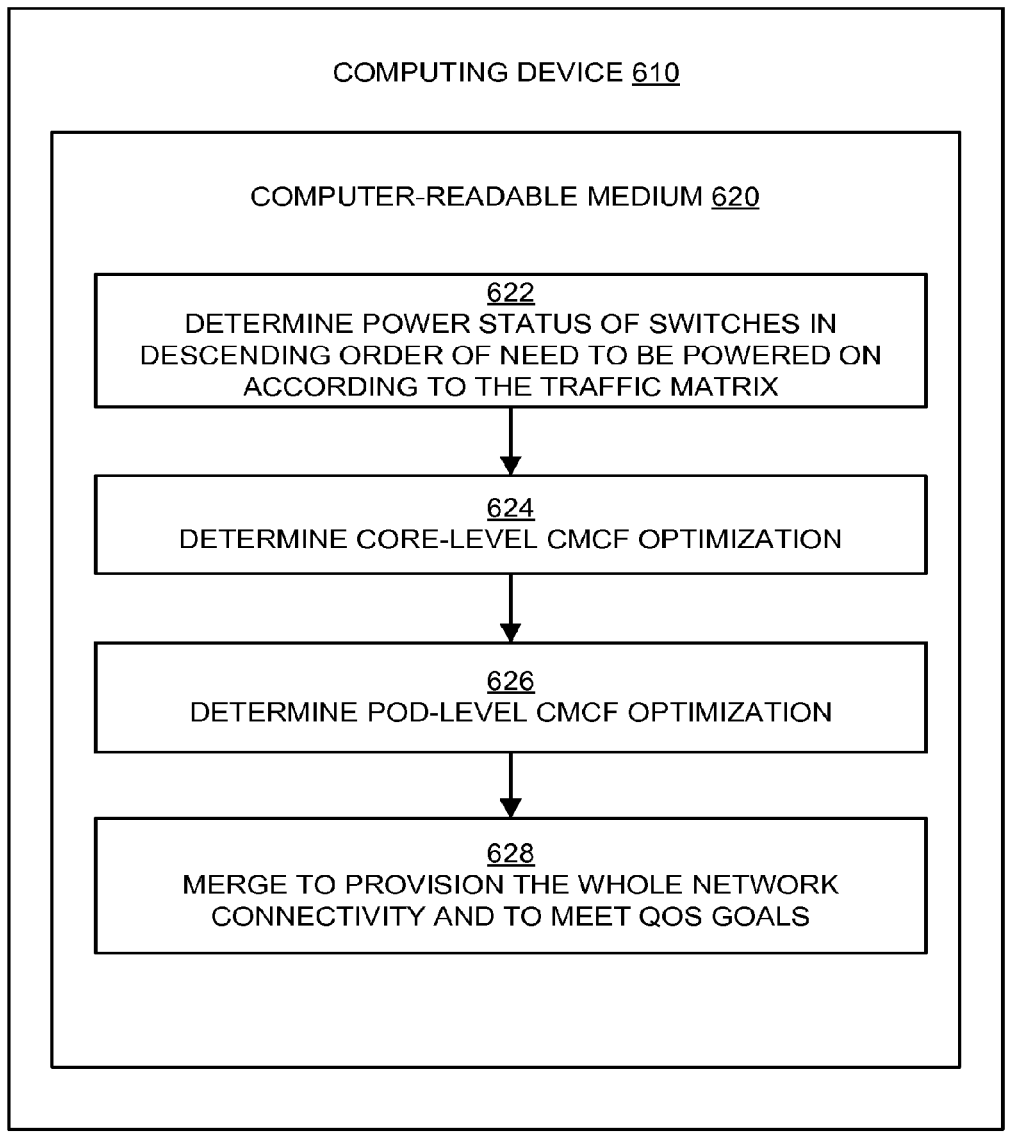
FIG. 6 is a flow diagram illustrating an example method that may be performed by a computing device such as the device in FIG. 5.

FIG. 6 is a flow diagram illustrating an example method that may be performed by a computing device such as the device in FIG. 5, arranged in accordance with at least some embodiments described herein. Example methods may include one or more operations, functions or actions as illustrated by one or more of blocks 622, 624, 626, and/or 628. The operations described in the blocks 622 through 628 may also be stored as computer-executable instructions in a computer-readable medium such as a computer-readable medium 620 of a computing device 610.

An example process for hierarchical energy optimization in datacenter networks may begin with block 622, "DETERMINE POWER STATUS OF SWITCHES IN DESCENDING ORDER OF NEED TO BE POWERED ON ACCORDING TO THE TRAFFIC MATRIX", where the power status of the edge switches and edge links connecting the end hosts and edge switches is determined according to the traffic matrix. All edge switches connecting to any source or destination server in the traffic matrix may be powered on. Block 622 may be followed by block 624, "DETERMINE CORE-LEVEL CMCF OPTIMIZATION," where core switches and core-level links connecting the core switches and aggregation switches is determined by solving the core-level CMCF optimization employing a heuristic. The aggregation switches which serve the outgoing traffic in each pod may be selected by using the power status of core-level links because the link between each aggregation switch and each core switch is unique.

Block 624 may be followed by block 626, "DETERMINE POD-LEVEL CMCF OPTIMIZATION". At block 626, the power status of the aggregation switches serving intra-pod traffic and that of the pod level links connecting the edge switches and aggregation switches in each pod are determined by solving the pod-level optimization. The aggregation switches selected to power on in the second stage and the link connecting the selected aggregation switch to the virtual node in each pod may be switched on. Block 626 may be followed by block 628, "MERGE TO PROVISION THE WHOLE NETWORK CONNECTIVITY AND TO MEET QoS GOALS", where a complementary process including one or more rules may be performed in order to protect the whole network connectivity and QoS goals.

The blocks included in the above described process are for illustration purposes. Hierarchical energy optimization for datacenter networks may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Figure 7:
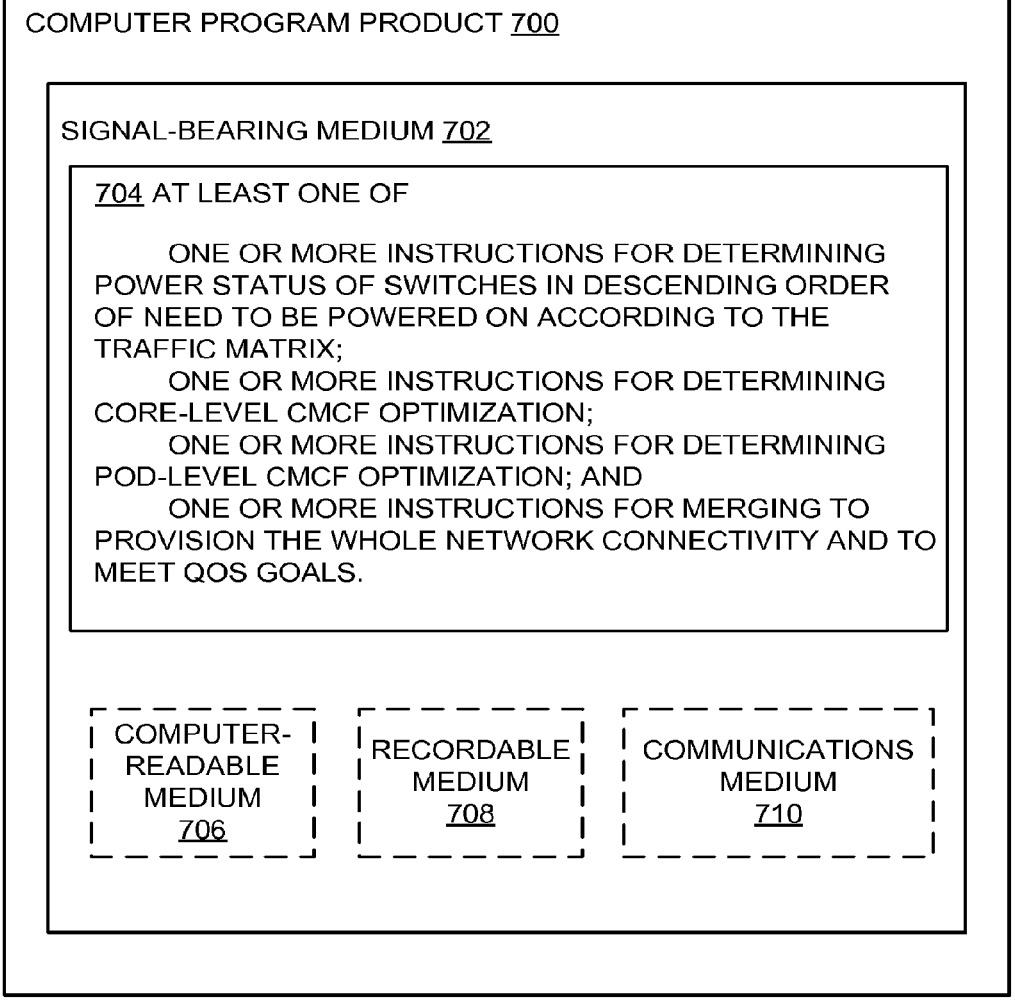
FIG. 7 illustrates a block diagram of an example computer program product, all arranged in accordance with at least some embodiments described herein.

FIG. 7 illustrates a block diagram of an example computer program product, arranged in accordance with at least some embodiments described herein. In some examples, as shown in FIG. 7, the computer program product 700 may include a signal bearing medium 702 that may also include one or more machine readable instructions 704 that, when executed by a processor may provide the functionality described herein. Thus, for example, referring to the processor 504 in FIG. 5, the optimization module 526 may undertake one or more of the tasks shown in FIG. 6 in response to the instructions 704 conveyed to the processor 504 by the medium 702 to perform actions associated with hierarchical energy optimization for datacenter networks as described herein. Some of those instructions may include, for example, instructions for determining power status of switches in descending order of need to be powered on according to the traffic matrix; determining core-level CMCF optimization; determining pod-level CMCF optimization; and merging to provision the whole network connectivity and to meet QoS goals according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method for providing hierarchical energy optimization in a datacenter network may include determining a power status of switches according to a network traffic matrix, determining a core-level capacitated multi-commodity flow (CMCF) optimization, determining a pod-level capacitated multi-commodity flow (CMCF) optimization, and performing a complementary process to provision whole network connectivity and to meet quality of service (QoS) goals.

The power status of the switches may be determined in a descending order of need to be powered on. The core-level CMCF optimization may be determined for edge switches and the pod-level CMCF is determined for aggregation switches. Determining the core-level CMCF optimization may include determining core switches that are to stay active to flow an outgoing traffic and determining aggregation switches which serve an out-pod traffic in each pod. Determining the pod-level CMCF may include determining aggregation switches that are to be powered to flow an intra-pod traffic. The method may further include powering edge switches connecting to any source or destination server in the traffic matrix or selecting aggregation switches which serve an outgoing traffic in each pod using the power status of core-level links.

The method may also include switching on aggregation switches selected to power on and links connecting the selected aggregation switches to a virtual node in each pod. The complementary process may include one or more predefined rules to achieve different QoS and fault tolerance goals. The core-level CMCF optimization may be subject to one or more constraints including: a flow conservation declaring that commodities are neither created nor destroyed at intermediate nodes, a demand satisfaction declaring that each source sends and each sink receives an amount of flow equal to its demand, a capacity and utilization constraint declaring that a total flow along each link is smaller than a link capacity weighed by a link utilization requirement factor, and a switch turn off rule declaring that a node can be turned off only if all incoming and outgoing links are actually turned off. The core-level CMCF may be characterized as:

$$P_{total}^C = \sum_{i=1}^{N^C} \sum_{j=1}^{N^C} x_{ij} P_{ij}^L + \sum_{i=1}^{N^C} y_i P_i^N$$

where $N^C$ represents a total number of nodes in a core-level sub-graph modeling a portion of the datacenter network, $x_{ij}$ is a binary variable that is equal to 1 if a link between node i and node j is powered on, otherwise equal to 0, $y_i$ is a binary variable that takes a value of 1 if node i is powered on, and $P_i^N$ and $P_{ij}^L$ denote a power consumption of node i and that of a link between node i and node j, respectively.

According to other examples, a server for providing hierarchical energy optimization in a datacenter network may include a memory configured to store instructions and a processing unit configured to execute a network management application in conjunction with the instructions. The network management application may determine a power status of switches according to a network traffic matrix, determine a core-level capacitated multi-commodity flow (CMCF) optimization, determine a pod-level capacitated multi-commodity flow (CMCF) optimization, and perform a complementary process to provision whole network connectivity and to meet quality of service (QoS) goals.

The power status of the switches may be determined in a descending order of need to be powered on. The core-level CMCF optimization may be determined for edge switches and the pod-level CMCF is determined for aggregation switches. The network management application may further determine the core-level CMCF optimization by determining core switches that are to stay active to flow an outgoing traffic and determining aggregation switches which serve an out-pod traffic in each pod and/or determine the pod-level CMCF by determining aggregation switches that are to be powered to flow an intra-pod traffic. The network management application may also power edge switches connecting to any source or destination server in the traffic matrix, select aggregation switches which serve an outgoing traffic in each pod using the power status of core-level links, and/or switch on aggregation switches selected to power on and links connecting the selected aggregation switches to a virtual node in each pod. The complementary process may include one or more predefined rules to achieve different QoS and fault tolerance goals.

The core-level CMCF optimization may be subject to one or more constraints including: a flow conservation declaring that commodities are neither created nor destroyed at intermediate nodes, a demand satisfaction declaring that each source sends and each sink receives an amount of flow equal to its demand, a capacity and utilization constraint declaring that a total flow along each link is smaller than a link capacity weighed by a link utilization requirement factor, and a switch turn off rule declaring that a node can be turned off only if all incoming and outgoing links are actually turned off. The core-level CMCF may be characterized as:

$$P^c_{total} = \sum_{i=1}^{N^c} \sum_{j=1}^{N^c} x_{ij} P^L_{ij} + \sum_{i=1}^{N^c} y_i P^N_i$$

where $N^C$ represents a total number of nodes in a core-level sub-graph modeling a portion of the datacenter network, $x_{ij}$ is a binary variable that is equal to 1 if a link between node i and node j is powered on, otherwise equal to 0, $y_i$ is a binary variable that takes a value of 1 if node i is powered on, and $P_i^N$ and $P_{ij}^L$ denote a power consumption of node i and that of a link between node i and node j, respectively. Furthermore, The datacenter network may have a two- or three-tier hierarchical switching infrastructure that includes one of a tree like switching architecture, a Fat-Tree architecture, a VL2 architecture, or a Portland architecture.

According to further examples, a computer-readable storage medium may have instructions stored thereon for providing hierarchical energy optimization in a datacenter network. The instructions may include determining a power status of switches according to a network traffic matrix, determining a core-level capacitated multi-commodity flow (CMCF) optimization, determining a pod-level capacitated multi-commodity flow (CMCF) optimization, and performing a complementary process to provision whole network connectivity and to meet quality of service (QoS) goals.

The power status of the switches may be determined in a descending order of need to be powered on. The core-level CMCF optimization may be determined for edge switches and the pod-level CMCF is determined for aggregation switches. Determining the core-level CMCF optimization may include determining core switches that are to stay active to flow an outgoing traffic and determining aggregation switches which serve an out-pod traffic in each pod. Determining the pod-level CMCF may include determining aggregation switches that are to be powered to flow an intra-pod traffic. The instructions may further include powering edge switches connecting to any source or destination server in the traffic matrix or selecting aggregation switches which serve an outgoing traffic in each pod using the power status of core-level links.

The instructions may also include switching on aggregation switches selected to power on and links connecting the selected aggregation switches to a virtual node in each pod. The complementary process may include one or more predefined rules to achieve different QoS and fault tolerance goals. The core-level CMCF optimization may be subject to one or more constraints including: a flow conservation declaring that commodities are neither created nor destroyed at intermediate nodes, a demand satisfaction declaring that each source sends and each sink receives an amount of flow equal to its demand, a capacity and utilization constraint declaring that a total flow along each link is smaller than a link capacity weighed by a link utilization requirement factor, and a switch turn off rule declaring that a node can be turned off only if all incoming and outgoing links are actually turned off. The core-level CMCF may be characterized as:

$$P^c_{total} = \sum_{i=1}^{N^c} \sum_{j=1}^{N^c} x_{ij} P^L_{ij} + \sum_{i=1}^{N^c} y_i P^N_i$$

where $N^C$ represents a total number of nodes in a core-level sub-graph modeling a portion of the datacenter network, $x_{ij}$ is a binary variable that is equal to 1 if a link between node i and node j is powered on, otherwise equal to 0, $y_i$ is a binary variable that takes a value of 1 if node i is powered on, and $P_i^N$ and $P_{ij}^L$ denote a power consumption of node i and that of a link between node i and node j, respectively.

According to yet other examples, a datacenter network capable of hierarchical energy optimization may include multiple edge switches enabling a flow of outgoing traffic, multiple aggregation switches serving out-pod traffic in pods comprising groups of aggregation switches, and a management server. The management server may determine a power status of the edge switches and the aggregation switches according to a network traffic matrix, determine a core-level capacitated multi-commodity flow (CMCF) optimization, determine a pod-level capacitated multi-commodity flow (CMCF) optimization, and perform a complementary process to provision whole network connectivity and to meet quality of service (QoS) goals.

The power status of the edge switches and the aggregation switches may be determined in a descending order of need to be powered on. The management server may be configured to determine the core-level CMCF optimization by determining core switches that are to stay active to flow an outgoing traffic. The management server may also determine the pod-level CMCF by determining aggregation switches that are to be powered to flow an intra-pod traffic. The management server may further power edge switches connecting to any source or destination server in the traffic matrix, select aggregation switches which serve an outgoing traffic in each pod using the power status of core-level links, and/or switch on aggregation switches selected to power on and links connecting the selected aggregation switches to a virtual node in each pod. The complementary process may include one or more predefined rules to achieve different QoS and fault tolerance goals.

The core-level CMCF optimization may be subject to one or more constraints including: a flow conservation declaring that commodities are neither created nor destroyed at intermediate nodes, a demand satisfaction declaring that each source sends and each sink receives an amount of flow equal to its demand, a capacity and utilization constraint declaring that a total flow along each link is smaller than a link capacity weighed by a link utilization requirement factor, and a switch turn off rule declaring that a node can be turned off only if all incoming and outgoing links are actually turned off. The core-level CMCF may be characterized as:

$$P^c_{total} = \sum_{i=1}^{N^c} \sum_{j=1}^{N^c} x_{ij} P^L_{ij} + \sum_{i=1}^{N^c} y_i P^N_i$$

where $N^C$ represents a total number of nodes in a core-level sub-graph modeling a portion of the datacenter network, $x_{ij}$ is a binary variable that is equal to 1 if a link between node i and node j is powered on, otherwise equal to 0, $y_i$ is a binary variable that takes a value of 1 if node i is powered on, and $P_i^N$ and $P_{ij}^L$ denote a power consumption of node i and that of a link between node i and node j, respectively. The edge switches and the aggregation switches may be configured in a two- or three-tier hierarchical switching infrastructure that includes one of a tree like switching architecture, a Fat-Tree architecture, a VL2 architecture, or a Portland architecture.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for providing hierarchical energy optimization in a datacenter network, the method comprising:
    determining a power status of switches according to a network traffic matrix;
    determining a core-level capacitated multi-commodity flow (CMCF) optimization;
    determining a pod-level capacitated multi-commodity flow (CMCF) optimization; and
    performing a complementary process to provision whole network connectivity and to meet quality of service (QoS) goals.

2. The method according to claim 1, wherein the power status of the switches is determined in a descending order of need to be powered on.

3. The method according to claim 2, wherein the core-level CMCF optimization is determined for edge switches and the pod-level CMCF is determined for aggregation switches.

4. The method according to claim 1, wherein determining the core-level CMCF optimization includes determining core switches that are to stay active to flow an outgoing traffic and determining aggregation switches which serve an out-pod traffic in each pod.

5. The method according to claim 1, wherein determining the pod-level CMCF includes determining aggregation switches that are to be powered to flow an intra-pod traffic.

6. The method according to claim 1, further comprising:
    powering edge switches connecting to any source or destination server in the traffic matrix.

7. A server for providing hierarchical energy optimization in a datacenter network, the server comprising:
    a memory configured to store instructions; and
    a processing unit configured to execute a network management application in conjunction with the instructions, wherein the network management application is configured to:
        determine a power status of switches according to a network traffic matrix;
        determine a core-level capacitated multi-commodity flow (CMCF) optimization;
        determine a pod-level capacitated multi-commodity flow (CMCF) optimization; and
        perform a complementary process to provision whole network connectivity and to meet quality of service (QoS) goals.

8. The server according to claim 7, wherein the network management application is further configured to:
    select aggregation switches which serve an outgoing traffic in each pod using the power status of core-level links.

9. The server according to claim 7, wherein the network management application is further configured to:
    switch on aggregation switches selected to power on and links connecting the selected aggregation switches to a virtual node in each pod.

10. The server according to claim 7, wherein the complementary process includes one or more predefined rules to achieve different QoS and fault tolerance goals.

11. The server according to claim 7, wherein the core-level CMCF optimization is subject to one or more constraints including: a flow conservation declaring that commodities are neither created nor destroyed at intermediate nodes, a demand satisfaction declaring that each source sends and each sink receives an amount of flow equal to its demand, a capacity and utilization constraint declaring that a total flow along each link is smaller than a link capacity weighed by a link utilization requirement factor, and a switch turn off rule declaring that a node can be turned off only if all incoming and outgoing links are actually turned off.

12. The server according to claim 11, wherein the core-level CMCF is characterized as:

$$P_{total}^c = \sum_{i=1}^{N^c} \sum_{j=1}^{N^c} x_{ij} P_{ij}^L + \sum_{i=1}^{N^c} y_i P_i^N,$$

where $N^C$ represents a total number of nodes in a core-level sub-graph modeling a portion of the datacenter network, $x_{ij}$ is a binary variable that is equal to 1 if a link between node i and node j is powered on, otherwise equal to 0, $y_i$ is a binary variable that takes a value of 1 if node i is powered on, and $P_i^N$ and $P_{ij}^L$ denote a power consumption of node i and that of a link between node i and node j, respectively.

13. The server according to claim 7, wherein the datacenter network has a two- or three-tier hierarchical switching infrastructure that includes one of a tree like switching architecture, a Fat-Tree architecture, a VL2 architecture, or a Portland architecture.

14. A datacenter network capable of hierarchical energy optimization, the datacenter network comprising:
    a plurality of edge switches enabling a flow of outgoing traffic;
    a plurality of aggregation switches serving out-pod traffic in pods comprising groups of aggregation switches; and
    a management server configured to:
        determine a power status of the edge switches and the aggregation switches according to a network traffic matrix;
        determine a core-level capacitated multi-commodity flow (CMCF) optimization;
        determine a pod-level capacitated multi-commodity flow (CMCF) optimization; and
        perform a complementary process to provision whole network connectivity and to meet quality of service (QoS) goals.

15. The datacenter network according to claim 14, wherein the power status of the edge switches and the aggregation switches is determined in a descending order of need to be powered on.

16. The datacenter network according to claim 14, wherein the management server is configured to determine the core-level CMCF optimization by determining core switches that are to stay active to flow an outgoing traffic.

17. The datacenter network according to claim 14, wherein the management server is configured to determine the pod-level CMCF by determining aggregation switches that are to be powered to flow an intra-pod traffic.

18. The datacenter network according to claim 14, wherein the management server is further configured to:
    select aggregation switches which serve an outgoing traffic in each pod using the power status of core-level links.

19. The datacenter network according to claim 14, wherein the management server is further configured to:
    switch on aggregation switches selected to power on and links connecting the selected aggregation switches to a virtual node in each pod.

20. The datacenter network according to claim 14, wherein the core-level CMCF optimization is subject to one or more constraints including: a flow conservation declaring that commodities are neither created nor destroyed at intermediate nodes, a demand satisfaction declaring that each source sends and each sink receives an amount of flow equal to its demand, a capacity and utilization constraint declaring that a total flow along each link is smaller than a link capacity weighed by a link utilization requirement factor, and a switch turn off rule declaring that a node can be turned off only if all incoming and outgoing links are actually turned off.

* * * * *